(No Model.) 8 Sheets—Sheet 2.

R. LOW.
MANUFACTURE OF HOLLOW PROJECTILES OR SHELLS.

No. 447,690. Patented Mar. 3, 1891.

Witnesses:
J. A. Rutherford
J. G. Meyers Jr.

Inventor:
Robert Low.
By James L. Norris.
Attorney.

(No Model.) 8 Sheets—Sheet 3.

R. LOW.
MANUFACTURE OF HOLLOW PROJECTILES OR SHELLS.

No. 447,690. Patented Mar. 3, 1891.

(No Model.)  8 Sheets—Sheet 5.

R. LOW.
MANUFACTURE OF HOLLOW PROJECTILES OR SHELLS.

No. 447,690.  Patented Mar. 3, 1891.

(No Model.) 8 Sheets—Sheet 7.
R. LOW.
MANUFACTURE OF HOLLOW PROJECTILES OR SHELLS.

No. 447,690. Patented Mar. 3, 1891.

(No Model.) 8 Sheets—Sheet 8.
R. LOW.
MANUFACTURE OF HOLLOW PROJECTILES OR SHELLS.

No. 447,690. Patented Mar. 3, 1891.

Witnesses:
J. A. Rutherford
J. G. Meyers Jr

Inventor:
Robert Low,
By James L. Norris.
Attorney

UNITED STATES PATENT OFFICE.

ROBERT LOW, OF LONDON, ENGLAND.

MANUFACTURE OF HOLLOW PROJECTILES OR SHELLS.

SPECIFICATION forming part of Letters Patent No. 447,690, dated March 3, 1891.

Application filed November 20, 1890. Serial No. 372,040. (No model.)

*To all whom it may concern:*

Be it known that I, ROBERT LOW, engineer, a subject of the Queen of Great Britain, and a resident of London, England, have invented certain new and useful Improvements relating to the Manufacture of Hollow Projectiles or Shells and to Apparatus therefor, of which the following is a specification.

My invention relates to the manufacture of hollow projectiles or shells for guns of large or small caliber and to improved apparatus to be used in such manufacture.

My said invention comprises an improved method of manufacturing a hollow projectile or shell in one or more heats from a cup-shaped blank of iron or steel.

An important feature of my said invention is the forging of the said blank by subjecting the same to compression between a series or group of revolving rolls or between a pair of companion half-dies, mounted one in the head and the other in the anvil or anvil-block of a suitable forging-press—such, for example, as a steam-hammer.
My said invention, moreover, comprises other improvements, hereinafter set forth.

In the accompanying drawings I have shown how my said invention may be conveniently and advantageously carried into practice.

Figs. 4 to 7, inclusive, are all drawn to an enlarged scale.
Fig. 8, also drawn to a reduced scale, is a vertical longitudinal central section of the apparatus I employ for forging projectiles between a pair of companion dies mounted upon the anvil-block and the hammer-head of a steam-hammer.
Figs. 12 to 20 show different stages in the manufacture of the projectile.

Similar letters refer to corresponding parts throughout the drawings.

Figure 1:
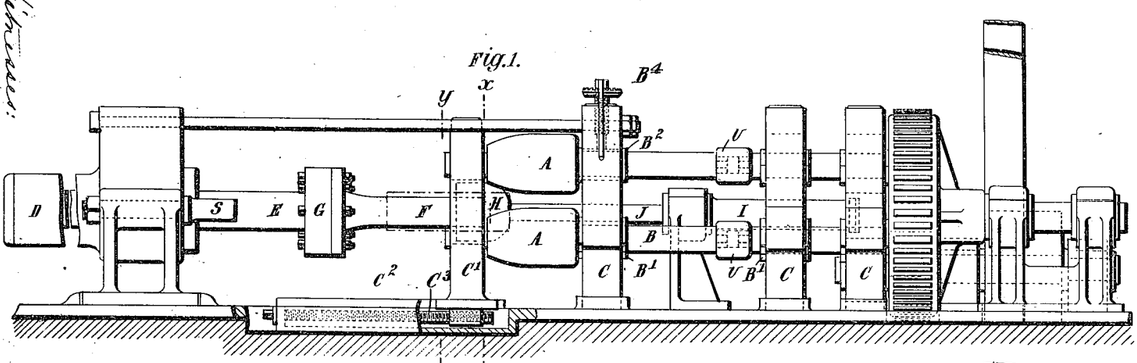
Figure 1 is a side elevation of one form of my improved apparatus for forging projectiles.
Figure 2:
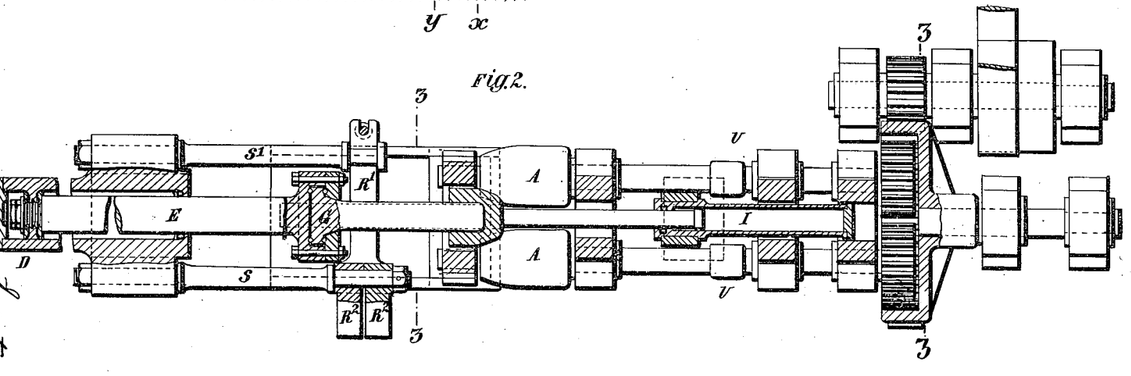
Fig. 2 is a plan thereof.
Figure 3:
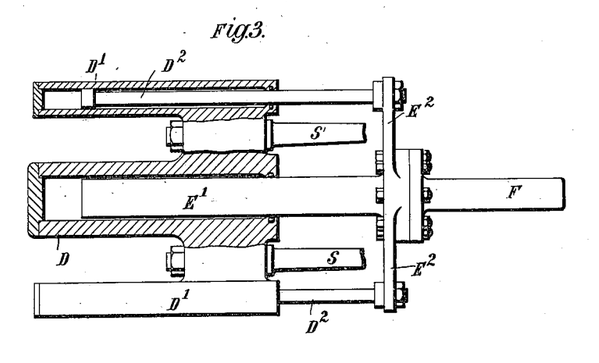
Fig. 3 is a plan of an apparatus embodying a modification of that shown in Figs. 1 and 2, as hereinafter described.

In the apparatus shown in Figs. 1, 2, and 3, A A represent the rolls, which are secured upon the shafts B, the latter being carried in suitable bearings $B'\ B^2$ in the standards or housings C C'.

D is a hydraulic ram fixed upon a suitable standard, the piston-rod E of which is provided with a mandrel F, attached or connected thereto by a coupling G. This mandrel serves to support the ingot H during the process of manufacture.

I is a cylinder having a piston, buffer, or plunger J adapted to move to and fro therein, acted on by a head of water or by a spring which tends to press the same outward with considerable force, the said cylinder I being situated, as shown, in such a position that its plunger or piston J is in line with the mandrel F, and presses against the ingot H, serving to hold the same on the mandrel and prevent distortion thereof, while permitting its longitudinal movement between the rolls A.

Figure 12:
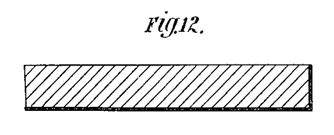
Figure 13:
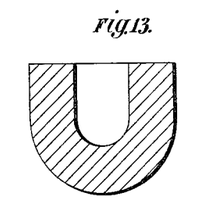
Figure 14:
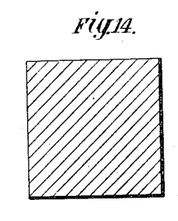
Figure 15:
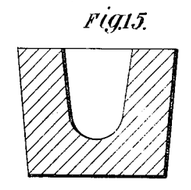
Figure 17:
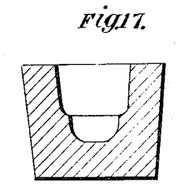

In making a hollow projectile or shell according to my said invention I find it advantageous to proceed as follows—that is to say, I take a solid block or ingot, as shown in Fig. 14, and form by punching or otherwise a central hole or cavity therein, preferably at the same time supporting the ingot in a mold adapted to impart to its outer surfaces a slight taper, as shown in Figs. 15 and 17. This hole may either be slightly tapered toward its inner extremity, as shown in Fig. 15, or may be of any other convenient form—as, for instance, of the form shown in Fig. 17, where the cavity is made of considerable width and a cup-shaped recess is formed in the bottom thereof adapted to serve as the powder-chamber in the finished shell. In manufacturing an armor-piercing shell I form a point of the form desired to be given to the point of the shell upon the ingot or block prior to passing the same through the rolls or between the dies. In some cases, instead of employing a block of steel and punching the same, I take a disk thereof, as shown in Fig. 12, and by means of suitable dies I work the same into a cupped form, as shown in Fig. 13. The recessed or cup-shaped ingot is then heated and placed on the end of the mandrel F, which is of such size and form as to exactly fit into the aforesaid central hole or cavity in the ingot. The said mandrel, as before mentioned, forms a continuation of the plunger E of a hydraulic ram, and is fitted into the same in such a manner that while compelled to move in and out with the said plunger it is quite free to rotate, ball-bearings E' being provided, if desired, to reduce the friction between the mandrel and plunger; or in lieu of employing a hydraulic ram I may provide the said mandrel F with a strong screw-thread F', as in the modification shown in Fig. 8, passing through a corresponding internally-threaded block or butt L, fixed in a suitable stationary standard M, so that by rotating the mandrel I provide for advancing and withdrawing the same.

Figure 4:
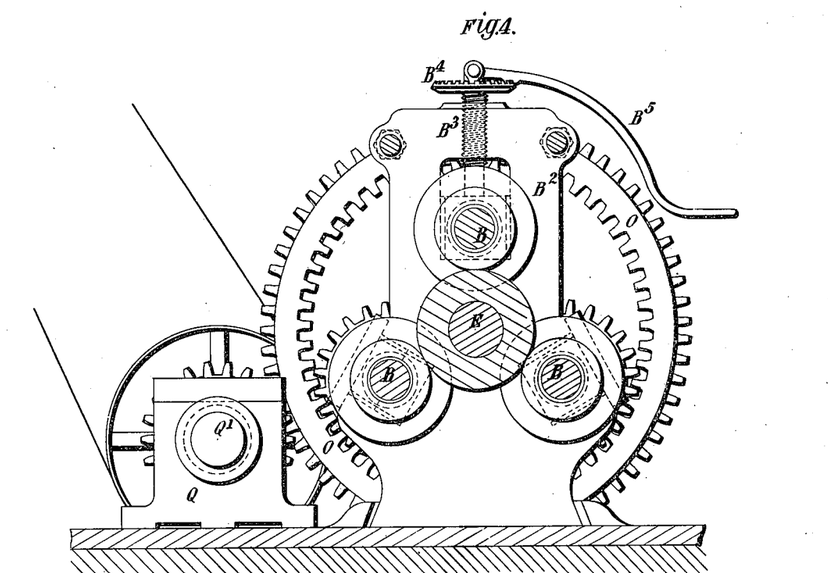
Fig. 4 is a transverse vertical section on the line $x\ x$, Fig. 1, showing certain details of construction.
Figure 5:
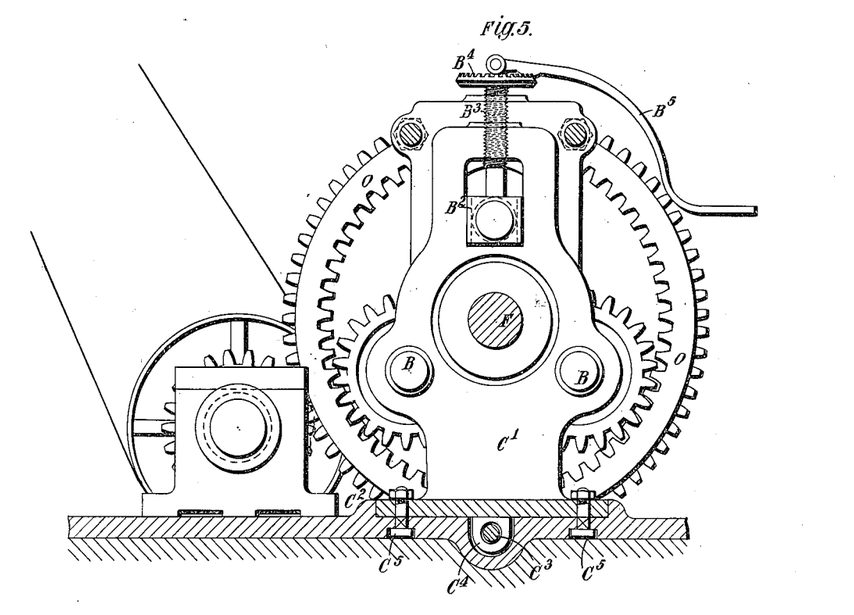
Fig. 5 is a transverse vertical section on the line $y\ y$, Fig. 1, showing a movable standard.

I provide, preferably, three chilled cast-iron or other suitable rolls A. These rolls are secured upon the shafts of axles B in such a manner that they can be easily removed therefrom, when desired, to allow of rolls of different diameter being substituted therefor, and the said shafts are so arranged that the axes thereof are parallel to each other and situated at points equidistant from the axial line of the aforesaid mandrel F, as shown more clearly in Fig. 5. The said rolls are moreover formed, as shown, with their forward ends, which first engage with the ingot, tapered or conical, to gradually reduce the diameter of the ingot and to more readily work the metal back over the mandrel. One or more of the roll-axles is or are preferably mounted in adjustable bearings, as shown at $E^2$, Figs. 3 and 4, which can be moved toward or away from the axial line of the mandrel for the purpose of slightly varying the size of the central space between the rolls by a screw $B^3$. For the purpose of turning the outer screw, the same has secured upon the outer extremity thereof a toothed wheel $B^4$ and a handle $B^5$, the said handle being connected to the screw by a suitable joint, so that it is free to turn upon the screw as a center and to be raised and lowered to engage with the teeth of the wheel $B^4$ and allow the same to be pushed around through the space of one or more teeth at each motion of the handle, thereby operating the said screw $B^3$, or the said screw may be operated in any other convenient manner.

Figure 6:
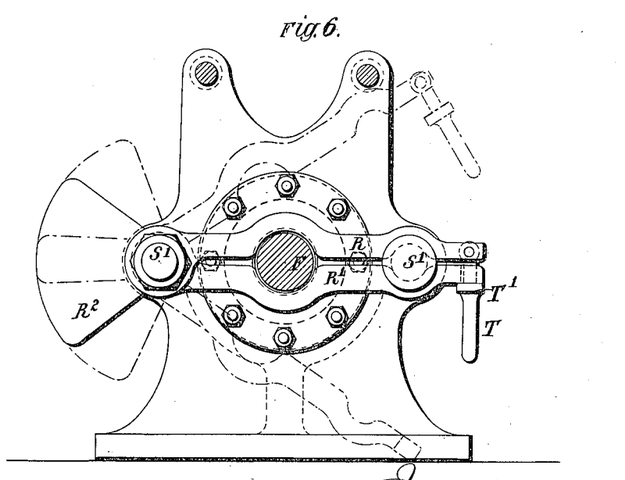
Fig. 6 is a transverse vertical section on the line $z\ z$, Fig. 2, showing the arrangement of gearing which I prefer to employ.

I prefer to provide for driving the rolls in the manner shown in Fig. 6 by means of toothed gearing comprising a strong annular toothed wheel O, provided with teeth both internally and externally and mounted on a central shaft and gearing internally with toothed wheels or pinions P on the roll-axles B and externally with a driving-pinion Q, to the shaft Q' of which motion is imparted by a belt or directly from the shaft of an engine or other suitable motor. I may, however, drive the rolls in any other convenient manner.

Figure 16:
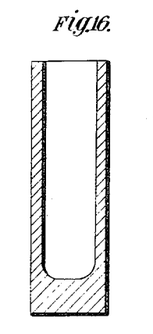
Figure 18:
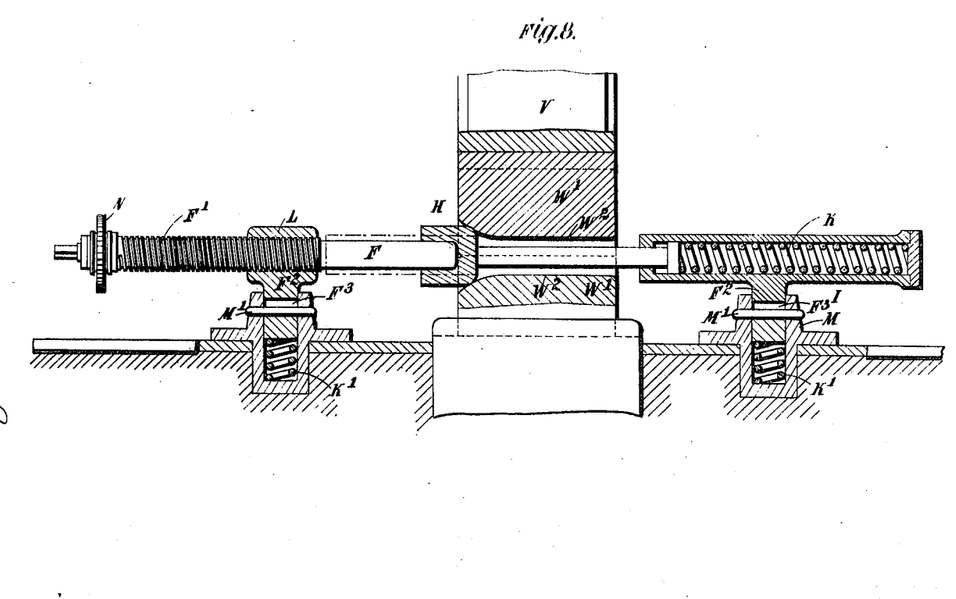
Figure 19:
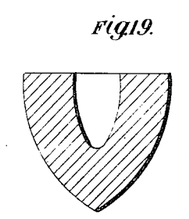
Figure 20:
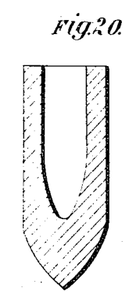

Having mounted the heated blank H on the mandrel provided to receive it, I slowly force the said blank in a longitudinal direction through the space between the rotating rolls by means of the hydraulic-ram D or screw device hereinbefore described, and in this manner, by the combined action of the rolls and the mandrel F, I reduce the blank by forcing the metal thereof back over the mandrel till it acquires the desired shape and size for forming the shell, as shown in Figs. 16, 18, or 20.

To prevent the blank H being advanced through the rolls too rapidly and to guard against the same falling off the mandrel or having the form of its extremity or point distorted, I employ the buffer-cylinder or hydraulic ram I, placed between the roll-axles and arranged to have its plunger abutting against the forward end of the blank. The said ram communicates with a hydraulic accumulator, (not shown in the drawings,) from which the necessary resisting force is supplied, or in case water-pressure is inconvenient or unobtainable the said resisting force may be obtained by the compression of a spring K, as in the modification of my apparatus shown in Fig. 8. In some instances, however, I may dispense with the buffer or plunger J. I may also, instead of employing a piston in the cylinder D, employ a ram E', as shown in Fig. 3, and in this case I provide the auxiliary cylinders D', having their piston-rods $D^2$ connected to a cross-piece $E^2$, secured upon the ram, these auxiliary cylinders serving to return the ram after it has performed its working stroke.

To facilitate the removal of the finished rolled shell from the mandrel F, I provide a stationary sleeve or clip embracing the said mandrel in a position behind the shell. The said sleeve is of less internal diameter than the external diameter of the shell, so that when the mandrel is withdrawn from the rolls the rear portion of the shell will encounter the fixed sleeve or bracket and be therewith stripped from the mandrel. This clip device or sleeve is shown in Fig. 6. R R' represent, respectively, the upper and lower arms of the clip, which is supported by suitable brackets or shafts S S', secured in the standard of the hydraulic cylinder D, to the former of which shafts the said portions R R' are pivoted. Both of the arms R R' are provided with suitable counter-weights $R^2$, and a catch T serves to hold the said arms together when the clip is closed, this catch being pivoted to one of them and having a projection T', with which the other clip may engage. The aforesaid counter-weights $R^2$ are moreover so adjusted as to weight that the clips R R' will on the disengagement of the catch T separate from one another, the upper one rising and the lower one falling, as indicated in dotted lines in Fig. 6. The clips R R' are so shaped as to closely surround the mandrel, so that when the same is drawn back, with the projectile thereon between the said clips, the projectile will engage, by reason of its diameter exceeding that of the mandrel, with the said clips and will in the continued backward movement of the mandrel be pushed off the same.

Figure 7:
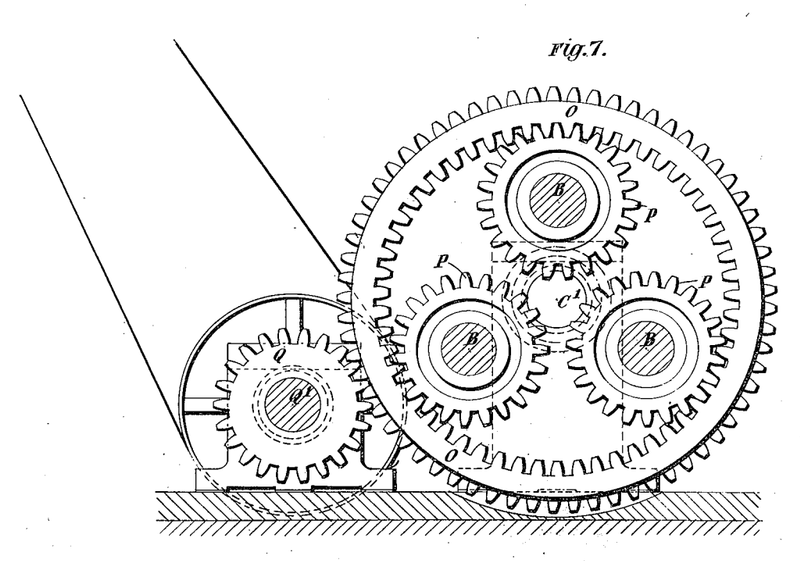
Fig. 7 is a similar section on the line $z'\ z'$, Fig. 2, showing a clip device hereinafter described.
Figure 9:
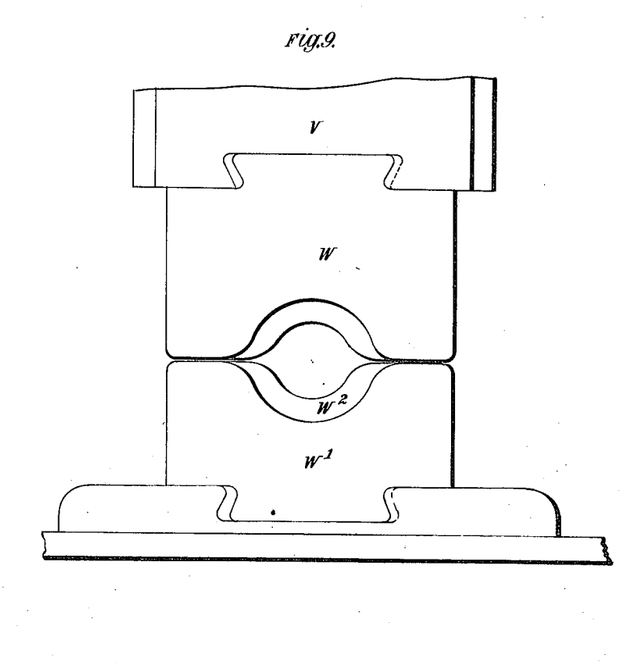
Fig. 9 is an end view of the said companion dies.
Figures 10, 11:
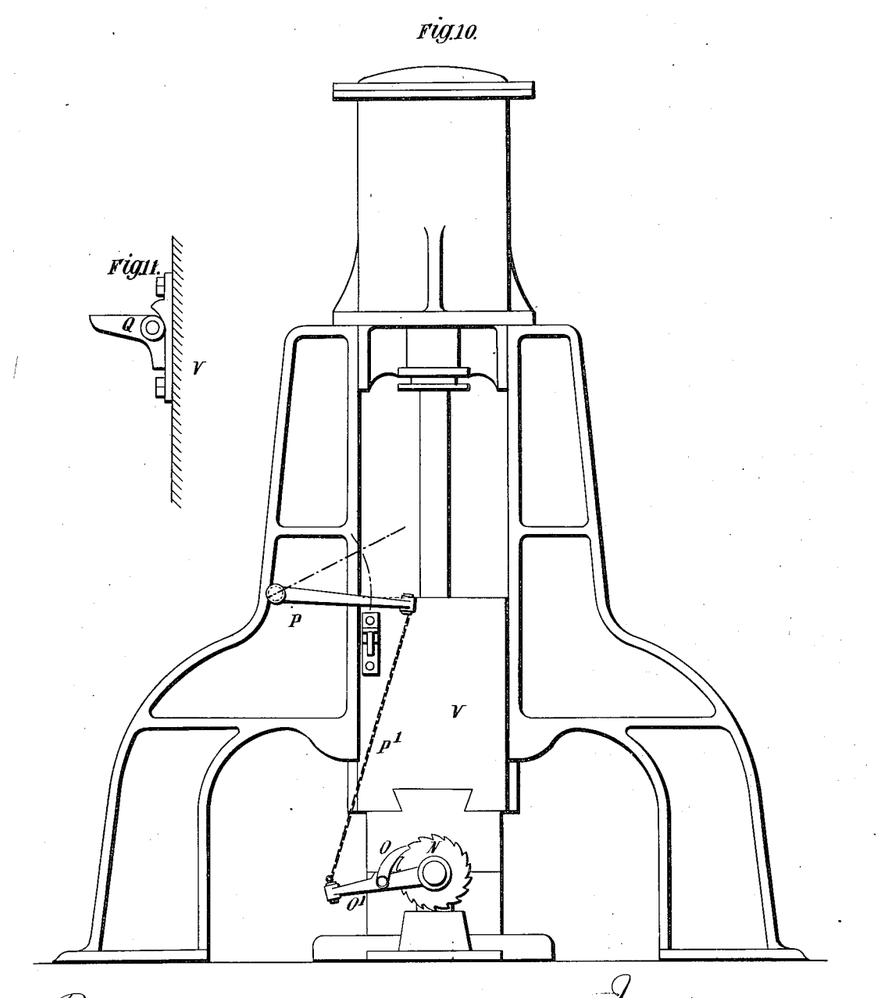
Fig. 10 is an end elevation, on a reduced scale, of my improved apparatus, showing combined therewith a device, hereinafter described, for automatically rotating the work between the dies.
Fig. 11 is a side elevation, on an enlarged scale, of a detail of the apparatus shown in Fig. 10.

I prefer to provide a series of rolls of different diameters, which may be substituted for each other, so that shells of different sizes may be forged in the same machine; and to facilitate the changing of these rolls I construct the housing or support C', which carries the bearings of the axles B, in such a manner that the same can slide longitudinally in guides $C^2$, secured to the base-plate or foundation of the machine, as shown in Figs. 1 and 7. A screwed shaft $C^3$, secured in bearings in the base-plate, can be turned by a suitable key for the purpose of moving the housing C', through an internally-screw-threaded projection $C^4$ of which it passes. It will be readily seen that by moving the said housing C' back from the axles B the rolls can be easily slipped off the ends of the said axles and other rolls fitted in place thereon. Suitable holding-down bolts $C^5$ are provided for securing the housing C' firmly upon its base-plate when in use.

To prevent injury to the driving-gear in case the rolls from any cause should become wedged fast or otherwise unduly strained when working, I arrange that in each roll-axle there shall be a weak coupling U or other equivalent device that will give way under the said circumstances. The said coupling or weak places are strong enough to drive the rolls under normal conditions; but their margin of strength is sufficiently small to insure their giving way under any abnormal stress before there is a possibility of injury to the driving-gear.

In the modification of my invention shown in Figs. 8 to 11 I employ a forging-machine, such as a steam-hammer, instead of the rolls A for forging the blank, the head V of the said forging-press or steam-hammer and the anvil block being provided, respectively, with suitable dies W W'. These dies have formed therein suitable recesses $W^2$, so that when the press or hammer-head is lowered and the two dies are in contact or almost in contact with one another the recesses inclose a space or cavity of approximately the same diameter as the finished shell and having a flaring or divergent opening at that side on which the projectile enters the said dies. In this modification of my invention I prefer to use the aforementioned screw arrangement for advancing the said blank, and the buffer J, moving in the cylinder I, and acted on by a spring K, as hereinbefore described, for preventing the blank leaving the mandrel. For this purpose I mount the brackets or fixed nut L, and also the cylinder I of the buffer, upon suitable supports $F^2$, adapted to slide up and down within vertical sockets M, and to rest in the said sockets upon suitable springs K' or upon similar devices, which allow of an elastic up-and-down movement while preventing lateral motion, so that as the blank H becomes smaller in diameter it may still rest upon the lower die W'. In forging a shell in this modified form of apparatus the blank H is placed upon the screw-threaded mandrel F, and the said mandrel is then turned slowly by hand or otherwise, thus effecting the feeding forward of the same by means of the screw-threads thereon working in the fixed nut L. The steam-hammer V is during this feeding motion being continuously and rapidly worked, thereby shaping the ingot into the proper form. When this is done the steam-hammer is stopped and lifted and the mandrel turned in the other direction, thereby screwing it back in the block L, with which the projectile comes into engagement, and is so separated from the mandrel. Suitable pins or stop-pieces M' are preferably passed through slots $F^8$ in the vertically-sliding supports $F^2$, and through the sockets M to limit the extent of the movements of the said supports. Although I may rotate the mandrel F by hand, I prefer to do so automatically by means of the ratchet-wheel N and the pawl O (shown more clearly in Fig. 10) on the outer end of the said mandrel. The pawl O is carried by an arm O', pivoted upon the axis of the mandrel and connected with a rocking lever P by means of a chain P', the said rocking lever being actuated by the rising and falling of the hammer. A suitable engagement-piece or projection Q (shown more clearly in Fig. 11) is bracketed upon the hammer-head V and projects into the path of the rocking lever P, so that in the upward movement of the hammer it engages with the said lever and raises the same, thereby raising the arm O' and causing the pawl O to engage with the teeth of the wheel N and rotate the mandrel, the chain-connection P' serving to permit the simultaneous endwise movement of the mandrel.

What I claim is—

1. The improved method of manufacturing a hollow projectile or shell by rolling or hammering an ingot of metal supported upon a rotatable mandrel and gradually forcing the metal of the said ingot back over the body of the said mandrel.

2. The improved method of manufacturing a hollow projectile or shell from an ingot or disk of metal by first punching or cupping the said disk or ingot and then rolling or hammering the same while supported upon a mandrel which is free to turn about its longitudinal axis.

3. The improved method of manufacturing a hollow projectile or shell from an ingot or disk of metal by first punching or cupping the said disk or ingot, so as to produce therein a cavity having the same or approximately the same shape as that of the cavity in the finished shell near its forward end, and then rolling or hammering the same while supported upon a mandrel which is free to turn about its longitudinal axis.

4. The improved method of manufacturing a hollow projectile or shell by rolling or hammering an ingot of metal, the said ingot having a central hole or cavity and being supported upon a rotatable mandrel adapted to enter the said hole or cavity and to force the ingot forward between suitable rolls or under a suitable hammer.

5. The improved method of manufacturing a hollow projectile or shell by rolling or hammering an ingot of metal supported upon a rotatable mandrel inserted into a hole or cavity therein and supported or retained upon the said mandrel by a ram or buffer adapted to press against the forward end thereof, substantially as described.

6. An apparatus for manufacturing hollow projectiles or shells, having a rotatable mandrel adapted to force the ingot from which the projectile is formed forward between suitable rolls or under a suitable pressing head or hammer while permitting the rotation thereof.

7. An apparatus for manufacturing hollow projectiles or shells, comprising a series of rolls of tapered form toward their forward ends arranged parallel with one another around a common center, and a rotatable mandrel to support the ingot from which the projectile is formed and which moves longitudinally to and fro in the space between the said rolls.

8. An apparatus for manufacturing hollow projectiles or shells, comprising a series of rolls arranged or disposed around a common center, a rotatable mandrel adapted to support the ingot from which the projectile is formed, and a hydraulic ram or buffer adapted to press against the forward end of the ingot and hold it in position upon the mandrel.

9. In an apparatus for the manufacture of hollow projectiles or shells by hammering under a pressing head or hammer, a rotatable mandrel for supporting and feeding the work in the said head or hammer provided with screw-threads adapted to work in a corresponding internally-threaded fixed nut or block.

10. The combination, in an apparatus for the manufacture of hollow projectiles or shells, of the rolls A, the rotatable mandrel F, the hydraulic ram E for forcing the same forward, and the subsidiary hydraulic ram or buffer J for holding the work on the said mandrel and for pressing the same backward when its stroke is completed.

11. In an apparatus for manufacturing hollow projectiles or shells, the combination, with the roll-shafts B, provided with the pinions P, of the internally and externally toothed gear-wheel O for driving the said pinions, substantially as described.

12. The combination, in an apparatus for the manufacture of hollow projectiles or shells, of a longitudinally-movable mandrel F, and a disengaging device comprising the clip-arms R R', bent so as to closely surround the said mandrel, secured together by the catch-piece T, substantially as set forth.

13. In an apparatus for the manufacture of hollow projectiles or shells, the pillars or base-pieces M, each having a socket in the upper part thereof containing a spring K', and a sliding plunger $F^2$, adapted to support the buffer-cylinder I or the screw-block L, as the case may be, for the purposes specified.

14. In an apparatus for the manufacture of hollow projectiles or shells, the combination of the forging-head or steam-hammer V, the screw-threaded mandrel F, working in the block L, the buffer J, working in the cylinder I, the spring-supported plungers $F^2$ for supporting the said block and cylinder, and the anvil-block W, substantially as described.

In testimony whereof I have hereunto signed my name in the presence of two subscribing witnesses.

ROBERT LOW.

Witnesses:
GEORGE HARRISON,
CHAS. B. BURDER.